United States Patent Office 3,356,569
Patented Dec. 5, 1967

3,356,569
CHOLINE CHLORIDE POWDER AND METHOD OF PRODUCTION
David Otis Nicodemus, Philadelphia, and John P. Mulroney, Southampton, Pa., assignors to Rohm & Haas Company, Philadelphia, Pa., a corporation of Delaware
No Drawing. Filed May 27, 1964, Ser. No. 370,665
8 Claims. (Cl. 167—55)

ABSTRACT OF THE DISCLOSURE

Stable encapsulated choline chloride particles are produced in dry powdered form by the simultaneous addition of an atomized aqueous choline chloride solution to a powdered additive followed by passing the combination into a spray dryer before the choline chloride particles come in contact with the surface of the dryer. The aqueous choline chloride solutions may be of any concentration up to the point of saturation, but solutions of 50%–80% by weight of choline chloride are preferred. The powdered additive has a maximum particle size of 100 microns and may be selected from Attapulgite Group clays, Kaolinite Group clays and walnut shell flour. Up to 10% of the powdered additive may be replaced by sodium bicarbonate, a silica gel or a combination thereof. The stable encapsulated choline chloride particles are substantially dry and free-flowing and they can be stored for reasonable lengths of time without caking or deterioration.

---

This invention is concerned with a powdered form of choline chloride which has a higher choline chloride content than hitherto known with retention of desirable flow and storage properties, and a process for producing this product.

Choline chloride chemically is (2-hydroxyethyl)trimethylammonium chloride. It is a source of choline which is one of the vitamin B-complex. It finds commercial use as a nutritional factor, primarily as a dietary supplement for poultry and swine, and for pharmaceutical applications. The compound in the pure, anhydrous state is a white, crystalline solid which is very soluble in water or alcohol. It is quite hygroscopic and very rapidly picks up enough moisture to become a syrupy liquid. Consequently, choline chloride is usually sold as a water solution—a 70% concentration is a common commercial form.

For convenience in use, in storage, in shipment and related considerations, it is desirable to have solid formulations. Various materials have been proposed as carriers for such solid preparations. These include byproducts from milling processes, such as ground corn cobs and wheat bran, proteinaceous substances, such as gelatin or powdered milk, and silica gels or aerogels. In most instances, the amount of choline chloride which can be incorporated in these solids and still retain free-flowing characteristics, high bulk density, stability, favorable economic considerations and other desirable features is too low for commercial considerations. Heretofore, commerical solid forms of choline chloride have contained a maximum of 60% choline chloride in order to maintain a dry, non-sticky solid which flows easily and will not adhere to the sides of containers, pipes, chutes, etc., and which will not cause difficulties in mixing equipment.

The present invention overcomes these difficulties and there is now made available a solid choline chloride of high choline chloride content, which can be readily made, which is substantially dry and free-flowing, and which can be stored for reasonable lengths of time without caking or deterioration.

The general process of the invention consists in atomizing an aqueous choline chloride solution into a spray drying chamber. Simultaneously, a powdered additive is introduced into the drying region of the spray dryer, preferably with the entering air stream, in order to disperse the additive in the area of atomization. Regardless of where the entrance of the powdered additive is located, it must be positioned so that the additive will come in contact with the partially dried choline chloride before these particles contact a surface of the dryer. As determined microscopically, the powdered additive appears to coat the outside of the choline chloride particles. The solid product is ultimately isolated from the solid-in-gas suspension.

In a normal spray drying process using a choline chloride solution by itself, sticky choline chloride particles are produced which do not flow freely from the drying system. By the process of this invention, these sticky particles are at least partially coated or encapsulated, probably by surface impregnation, and thus rendered into a dry, free-flowing powder. By free-flowing is meant that the solid will flow through the drying system and separator without troublesome accumulation on the walls and remain uncaked in storage.

In a normal spray drying process, hot air is charged to a chamber along with an atomized fluid. Intimate contact between the fluid and the hot gas results in evaporation of the volatiles in the fluid leaving a suspension of the solid, dry powder in the gas. The suspension is removed from the drying chamber and is separated into solid and gas by mechanical means.

At the start of this investigation, a slurry of choline chloride solution and Diluex clay (a type of attapulgite having an average particle size of 1.6 to 1.9 microns; it is described on page 203 of the Handbook of Insecticide Dust Diluents and Carriers, Dorland Books, Caldwell, N.J., 1955) was prepared and used in a normal spray drying process. The problems which were encountered in the process were as follows:

(1) In attempting to prepare a homogeneous slurry, difficulty was encountered in wetting the Diluex clay with the choline chloride solution.

(2) During the process of preparation and storage of the slurry, the viscosity of the slurry increased significantly under the influence of time and/or shearing.

(3) In feeding the slurry to the spray dryer, abrasion occurred to the atomizing system.

(4) The product adhered to the walls of the drying chamber and the walls of the collection system, thereby contributing to lower recovery from the collection system.

(5) The poor flow properties of the product impaired removal of the solid from the collecting system by normal means, as with a rotary valve.

(6) During storage in moisture proof bags, the product caked.

In most instances, the first three problems could be solved or alleviated by using a slurry with less than 50% solids, provided the ratio of clay to choline chloride was less than 1:2. However, under these conditions, the flow properties of the dried product still remained poor regardless of the dilution of the slurry so that problems (4), (5) and (6) were not solved. Problems (4), (5) and (6) might have been at least partially alleviated by producing a material containing less active ingredient; however, economy dictated that the concentration of the active ingredient in the final product should be as high as possible in conformity with a dry, free-flowing powder.

The choline chloride solutions which are useful in this invention may be aqueous solutions of any concentration up to the point of saturation. For reasons of economy, solutions which contain 50% to 80% by weight of choline chloride are preferred.

The type of powdered additive which will function in this process is limited. One requirement is that it should not be objectionable, as a feed additive. Of various diluents evaluated, only certain clays and walnut shell flour have produced a product of the desired characteristics. Part of these additives can be replaced by other materials to achieve specific objectives as discussed below.

These are two types of clays which can be used to produce an acceptable product. These are classified as (1) Attapulgite Group clays and (2) Kaolinite Group clays in the Handbook of Insecticide Dust Diluents and Carriers, Dorland Books, Caldwell, New Jersey, 1955.

The attapulgite clays are silicate minerals which contain both aluminum and magnesium. These clays are characterized by fibrous particles which are an agglomeration of needles and are highly porous. The attapulgite minerals useful for the purpose of this invention include the clays (a type of attapulgite having an average particle size of 1.6 to 1.9 microns; it is described on page 203 of the Handbook of Insecticide Dust Diluents and Carriers, Dorland Books, Caldwell, N.J., 1955) known as Diluex, Attaclay (a type of attapulgite clay which is a hydrated magnesium aluminum silicate having an average particle size of about 1.2 microns; it is described on page 208 of the Handbook of Insecticide Dust Diluents and Carriers, Dorland Books, Caldwell, N.J., 1955) and Attapulgite (an attapulgite group clay which is defined hereinbelow and on pages 200–213 of the Handbook of Insecticide Dust Diluents and Carriers, Dorland Books, Caldwell, N. J., 1955) which are commonly used as dust diluents and carriers for pesticides.

The kaolinite clays are aluminum silicates and the pure mineral has the formula $$Al_2(Si_2O_5)(OH)_4$$

The kaolinite group of minerals is divided into definite members and those members which are used as insecticide diluents or carriers, namely, kaolinite, nacrite and dickite, are the ones most useful for the present invention. These clays are characterized as flat plates which are pseudohexagonal in outline and have good flow properties. The kaolinite minerals useful for the purpose of this invention include the clays known as Barden, Continental, Kaolin, Kaolloid, Seminole, Suprex and Velvex. These kaolinite group clays are described in the Handbook of Insecticide Dust Diluents and Carriers, Dorland Books, Caldwell, N.J. 1955, pages 161–200.

Of the botanical flours tried in the process, only walnut shell flour gave an acceptable product.

The basic requirements for an additive are:

(1) they are sufficiently divided or powdered so they disperse readily in the drying region of the spray dryer; normally the maximum particle size would be 100 microns;

(2) they flow freely by themeselves, so they can impart this characteristic to the choline chloride product;

(3) they do not become sticky if they absorb a few percent of moisture;

(4) they adhere to the surface of the choline chloride particles, so that the free-flowing characteristic is retained during storage; and (5) they are present in sufficient quantity to impart the desired characteristics.

Up to 10% of the additive can be replaced by sodium bicarbonate, a silica gel, or a combination of these materials, and the objects of the invention are still achieved. Sodium bicarbonate reduces the corrosiveness of the product during its manufacture. Silica gel improves the flow properties of the product. A convenient form of silica gel for this purpose is one known as Cab-O-Sil (a submicroscopic 0.15–0.020 particulate silica produced by Godfrey L. Cabot, Inc., Boston, Mass.).

Various other additives tried in the process of this invention and which proved deficient in one or more aspects were:

(1) Gelatin—solids adhered to wall of dryer.
(2) Wheat flour—product had poor flow properties.
(3) Corn starch—solids adhered to wall of dryer.
(4) Wood flour—gave difficulties with feeding into dryer and product had poor flow properties.
(5) A polyacrylic acid derivative—Acrysol GS, a 12.5% solution of poly(sodium acrylate) in water produced by Rohm & Haas Co., Phila., Pa.—No product recoverable from separator.
(6) Polyvinyl alcohol—Elvanol, a high molecular weight polyvinyl alcohol produced by E. I. du Pont de Nemours, Wilmington, Del.—The additive fused and charred.
(7) Lime—gave difficulties with feeding into dryer and product was wet.
(8) Sodium bicarbonate—gave difficulties with atomization and product had poor flow properties.

In operating the spray dryer, it is preferred to keep the inlet temperature as high as possible and the outlet temperature as low as possible for the sake of economy. As long as the inlet air temperature of the spray dryer is sufficient to remove water from the atomized choline chloride solution and not so high that excessive decomposition of the choline chloride occurs, this inlet temperature may be varied over a wide range. Likewise, the air outlet temperature of the dryer may be varied over a wide range just so long as it is sufficient to obtain a dry, free-flowing powder and not too high to cause excessive decomposition. There are many variations possible in the design of spray dryers and specific conditions would have to be decided on for each consistent with the above principles and the economics involved.

An aqueous slurry of choline chloride and Diluex clay was found to decompose at 118° C. When this slurry was spray dried, the product was corrosive to stainless steel (AISI Type 304) at 120° C. Using the process of this invention with Diluex clay as the additive, the product was not corrosive to this stainless steel until the temperature was raised to 140° C. Using the process of this invention with 9:1 ratio of Diluex clay and sodium bicarbonate as the additive, the product was not corrosive to this stainless steel with the temperature raised to 160° C.

By the process of this invention, it is possible to produce a powdered form of choline chloride having a choline chloride content up to 85% and which remains free-flowing, is stable, and has desirable storage characteristics. At concentrations above 85%, the flow properties become poor. The minimum amount of powdered additive which will produce a stable, substantially dry, free-flowing choline chloride powder is a weight equal to 12% of the weight of choline chloride powder. In the final dried choline chloride powder produced, there is usually a small amount of moisture remaining which may vary from 0% to about 5%. In the choline chloride compositions prepared by the process of this invention, it is preferred that the choline chloride be in the range of 68% to 85% by weight.

The following examples illustrate the method of preparation for the choline chloride powders of this invention.

EXAMPLE 1

*Preparations using Diluex clay*

(a) Spray drying of an aqueous slurry of choline chloride and Diluex.

A slurry was prepared by mixing 970 pounds of a 63% aqueous choline chloride solution and 300 pounds of Diluex clay. This slurry was heated to 140° F. and had a viscosity of 480 centipoises. The slurry was pumped to a 10-foot diameter spray dryer and atomized at a pressure of 1500 pounds per square inch by means of a nozzle into the dryer. The slurry, after pumping, was found to have increased in viscosity to 11,000 centipoises. Air was introduced into the dryer at a rate of 8,000 cubic feet per minute and at a temperature of 320° F. The mixture of dried solids and air was exhausted from the chamber at 190° F. into a cyclone collector and from this the solid was collected in drums. Solids accumulated on the walls of the drying chamber. There was a build-up of solids on the walls of the cyclone collector and this mately the same length of time. In this manner, a substantially uniform surface impregnation of the dried choline chloride particles occurred. The solid product was separated by means of a cyclone collector and discharged into a container. The following table gives details of these preparations, all of which gave a stable, dry, free-flowing choline chloride powder suitable for commercial use.

TABLE.—POWDERED CHOLINE CHLORIDE PREPARATIONS

| Example | Introducted Into Spray Dryer | | | Length Of Run (min.) | Solids Recovered, Percent | Product | |
|---|---|---|---|---|---|---|---|
| | Choline Chloride (Dry Basis) lbs. | Additive | | | | Choline Chloride, Percent | Water, Percent |
| | | Kind | Lbs. | | | | |
| 1(c) | 12 | Diluex clay | 8.3 | 62 | 86 | 58 | 2.6 |
| 1(d) | 13.7 | do | 4.2 | 62 | 100 | 68 | 2.2 |
| 1(e) | 18 | do | 5.2 | 68 | 90 | 78 | 1.9 |
| 2 | 19 | Attaclay X-250 | 4.5 | 73 | 94 | 80 | 1.1 |
| 3 | 11 | Barden clay | 1.4 | 45 | 100 | 85 | 1.6 |
| 4 | 20 | Walnut shell flour | 3.5 | 75 | 94 | 78 | 1.2 |
| 5 | 14 | Diluex clay+Cab-O-Sil at 9:1 wt. ratio. | 4 | 59 | 97 | 74 | 2.1 |
| 6 | 22 | Diluex clay+Cab-O-Sil at 97.5:2.5 wt. ratio. | 5.6 | 100 | 99 | 75 | 2.3 |
| 7 | 19 | Diluex clay+Sodium bicarbonate at 9:1 wt. ratio. | 4 | 95 | 96 | 76 | 2.3 | periodically blocked the flow of the product into the collecting drums and necessitated hammering on the walls to again start the flow. The dried choline chloride powder caked in the collecting drums. The amount of solid recovered from the collector represented 64% of the 912 lbs. theoretical. By cleaning out the dryer, another 15% of the solid product was recovered, thus increasing the total solids accountability to 79%. The product was found by analysis to contain 65% choline chloride.

By this method, there was difficulty with the viscosity of the original slurry increasing, with solids adhering to the walls of the drying and collecting system, with caking of the product, and with poor yields.

(b) Spray drying by separate feeding of aqueous choline chloride solution and Diluex.

Another preparation was made in the same spray dryer and with the same drying conditions except that the choline chloride solution was atomized alone while the Diluex clay was fed directly into the top of the dryer. The clay was supplied at such a rate that approximately 1 lb. of it was fed into the dryer for every 3.2 lbs. of the choline chloride solution which was atomized. The solids on the walls of the dryer rapidly reached an equilibrium depth and flowed readily through the collecting system. No trouble was experienced in discharging the solids from the cyclone collector. The product flowed freely into the container drums and did not cake. The solid which collected in the drums amounted to 82% of the solids fed into the dryer and a partial cleaning of the dryer increased this amount to 87%. The resulting dry, free-flowing solid contained by analysis 72% choline chloride.

OTHER EXAMPLES

A series of runs was made in a manner of that described in Example 1(b), but using a 4-foot diameter spray dryer. Air was passed in at the rate of 250 cubic feet per minute and entered the chamber at a temperature of about 170° to 210° C. and left it at a temperature of about 110° C. A 63% aqueous solution of choline chloride was atomized into the chamber of the spray dryer through a nozzle at a pressure of 100 pounds per square inch. The powdered additive was introduced into the top of the drying chamber near the air inlet by means of a screw-type conveyor. The rate of introduction of the two feed streams into the drying chamber was adjusted so that both materials were added in approxi- In the same manner, other aqueous choline chloride solutions up to 80% concentration may be used and the amount of the powdered additive may be varied so that the final product contains choline chloride up to 85%.

The choline chloride powders of this invention may be used alone or in admixture with other materials commonly used in animal feeds. Likewise, the powder may be shaped into other forms, such as pellets, if desired.

By means of this invention, there are provided new choline chloride powders of high choline chloride content which are essentially dry, free-flowing and stable, and which are made by a novel and economic process. Such a product fulfills a long standing commercial need.

We claim:

1. A stable, substantially dry, free-flowing powder comprising choline chloride substantially encapsulated by a powdered additive selected from the group consisting of attapulgite clay, a mixture of attapulgite clay and a second additive selected from the group consisting of silica gel and sodium bicarbonate wherein said second additive is no more than 10% of the weight of the mixture, kaolinite clay, a mixture of kaolinite clay and a second additive selected from the group consisting of silica gel and sodium bicarbonate wherein said second additive is no more than 10% of the weight of the mixture, walnut shell flour, and a mixture of walnut shell flour and a second additive selected from the group consisting of silica gel and sodium bicarbonate wherein said second additive is no more than 10% of the weight of the mixture, said powder containing 68% to 85% choline chloride on an anhydrous weight basis.

2. A stable, substantially dry, free-flowing powder comprising choline chloride substantially encapsulated by an attapulgite clay, said powder containing from about 68% to about 85% of choline chloride on an anhydrous weight basis.

3. A stable, substantially dry, free-flowing powder comprising choline chloride substantially encapsulated by an attapulgite clay having an average particle size of 1.6 to 1.9 microns, said powder containing from about 68% to about 85% of choline chloride on an anhydrous weight basis.

4. A stable, substantially dry, free-flowing powder comprising choline chloride substantially encapsulated by a mixture of an attapulgite clay and sodium bicarbonate wherein the sodium bicarbonate is no more than 10% of the mixture, said powder containing from about 68% to about 85% of choline chloride on an anhydrous weight basis.

5. A stable, substantially dry, free-flowing powder comprising choline chloride substantially encapsulated by a kaolinite clay, said powder containing from about 68% to about 85% of choline chloride on an anhydrous weight basis.

6. A stable, substantially dry, free-flowing powder comprising choline chloride substantially encapsulated by walnut shell flour, said powder containing from about 68% to about 85% of choline chloride on an anhydrous weight basis.

7. In a spray-drying process for the production of a stable, substantially dry, free-flowing powder containing from 68% to about 85% by weight of choline chloride substantially encapsulated by a powdered additive selected from the group consisting of attapulgite clay, a mixture of attapulgite clay and a second additive selected from the group consisting of silica gel and sodium bicarbonate wherein said second additive is no more than 10% of the weight of the mixture, kaolinite clay, a mixture of kaolinite clay and a second additive selected from the group consisting of silica gel and sodium bicarbonate wherein said second additive is no more than 10% of the weight of the mixture, walnut shell flour, and a mixture of walnut shell flour and a second additive selected from the group consisting of silica gel and sodium bicarbonate wherein said second additive is no more than 10% of the weight of the mixture, the steps comprising (a) atomizing an aqueous choline chloride solution into the drying chamber of a spray dryer,
(b) simultaneously feeding into the drying chamber as a separate feed said powdered additive, and
(c) collecting the choline chloride powder which has become impregnated with the powdered additive.

8. In a spray-drying process for the production of a stable, substantially dry, free-flowing powder containing from 68% to about 85% by weight of choline chloride, according to claim 7, the step wherein said powdered additive is simultaneously fed into the drying chamber with the entering air stream as a separate feed.

References Cited

UNITED STATES PATENTS

| | | | |
|---|---|---|---|
| 2,765,231 | 10/1956 | Plitt | 99—2 |
| 2,879,161 | 3/1959 | Vallentine | 99—2 |

FOREIGN PATENTS

| | | |
|---|---|---|
| 1,307,421 | 9/1962 | France. |

OTHER REFERENCES

Chemical Abstracts, 59:447 (1963).

Watkins, T. C., et al., "Handbook of Insecticide Dust Diluents and Carriers," Dorland (1955) p. 4.

SAM ROSEN, *Primary Examiner.*

S. SINGER, *Assistant Examiner.*